June 22, 1926.
C. CHRISTENSEN
1,589,366
MEANS FOR CONNECTING AND DISCONNECTING ELECTRICAL CIRCUITS
Filed May 18, 1921    7 Sheets-Sheet 2
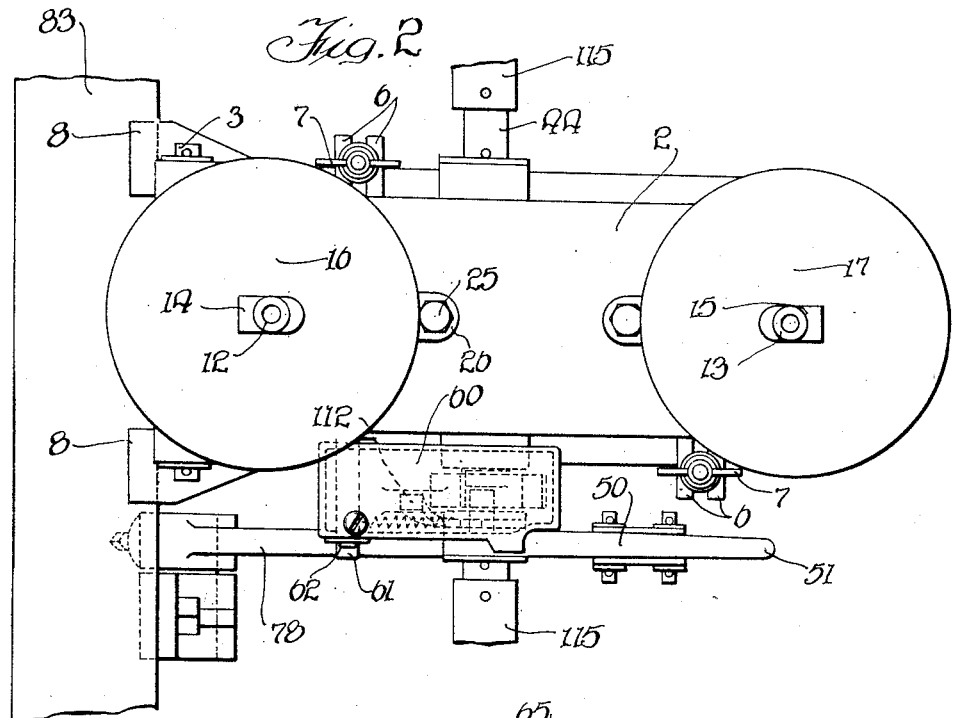
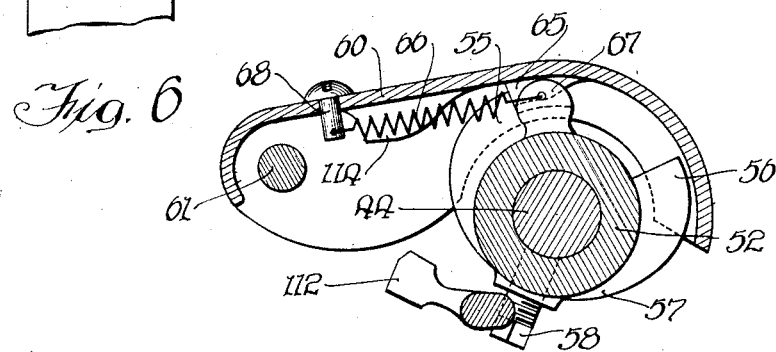
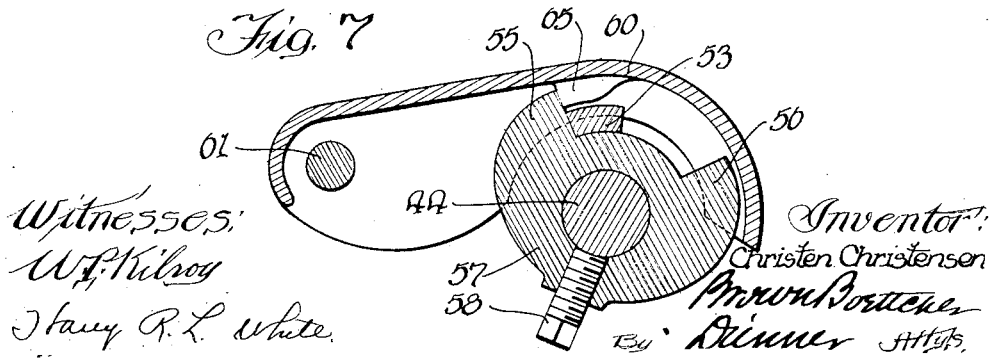

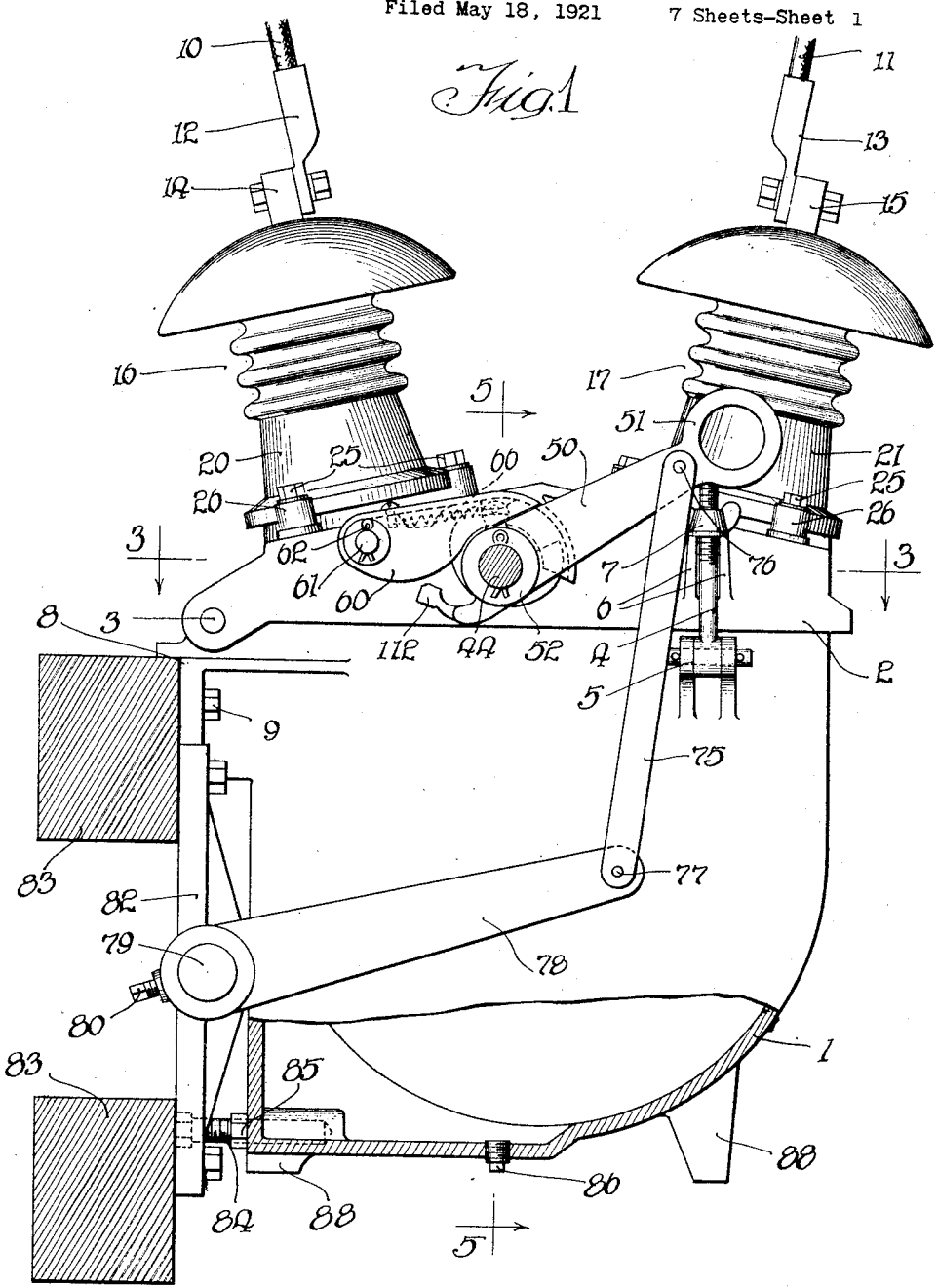

June 22, 1926.  1,589,366
C. CHRISTENSEN
MEANS FOR CONNECTING AND DISCONNECTING ELECTRICAL CIRCUITS
Filed May 18, 1921    7 Sheets-Sheet 3
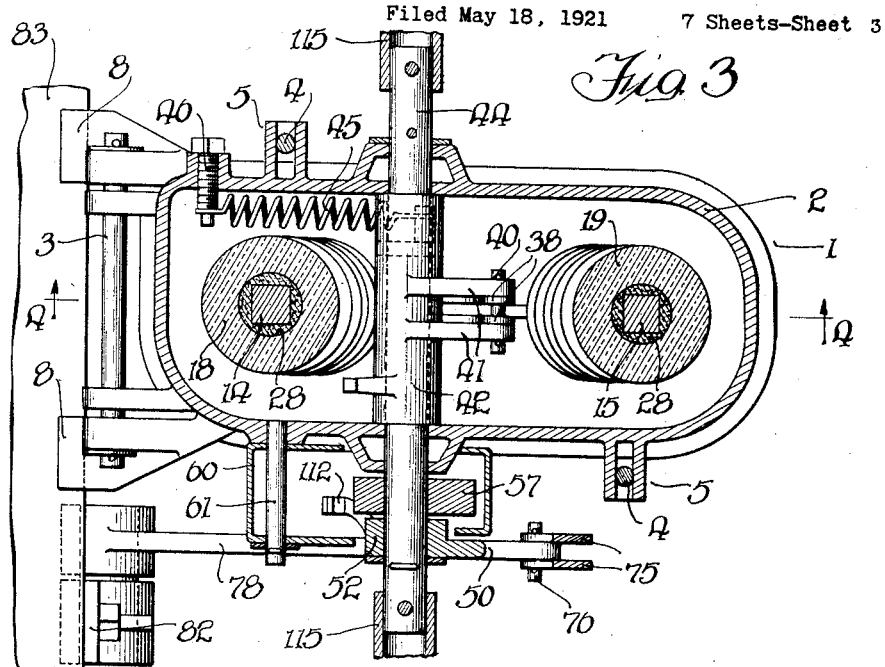
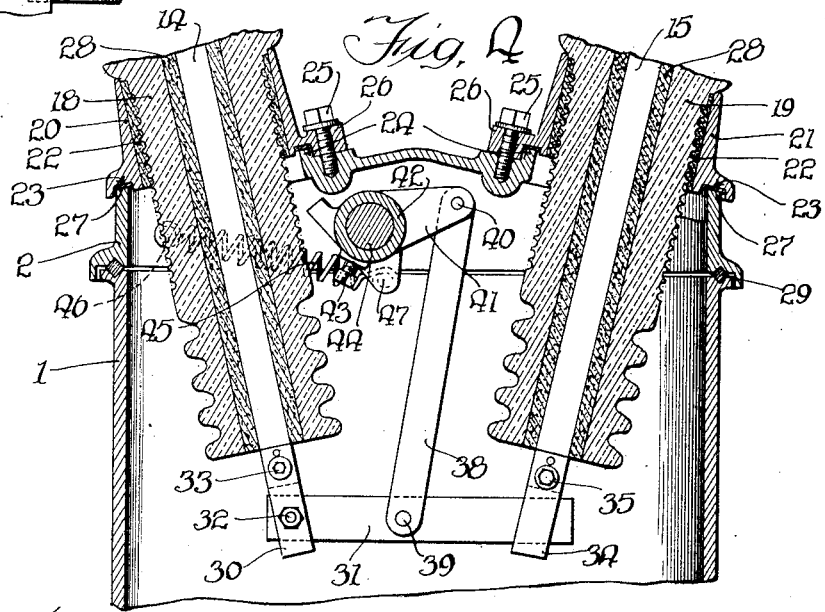
Witnesses:
W. F. Kilroy
Harry R. LeWhite
Inventor:
Christen Christensen
By Brown Boettcher Dienner
Attys

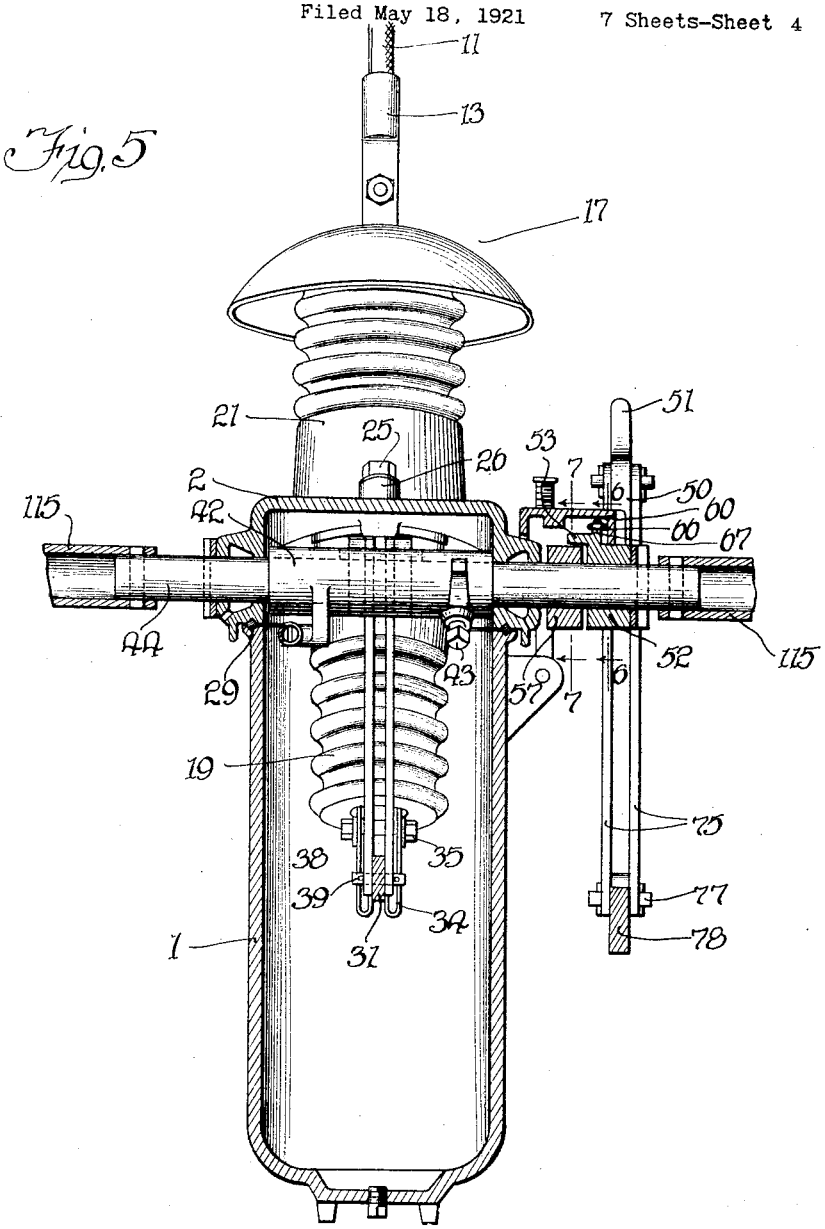

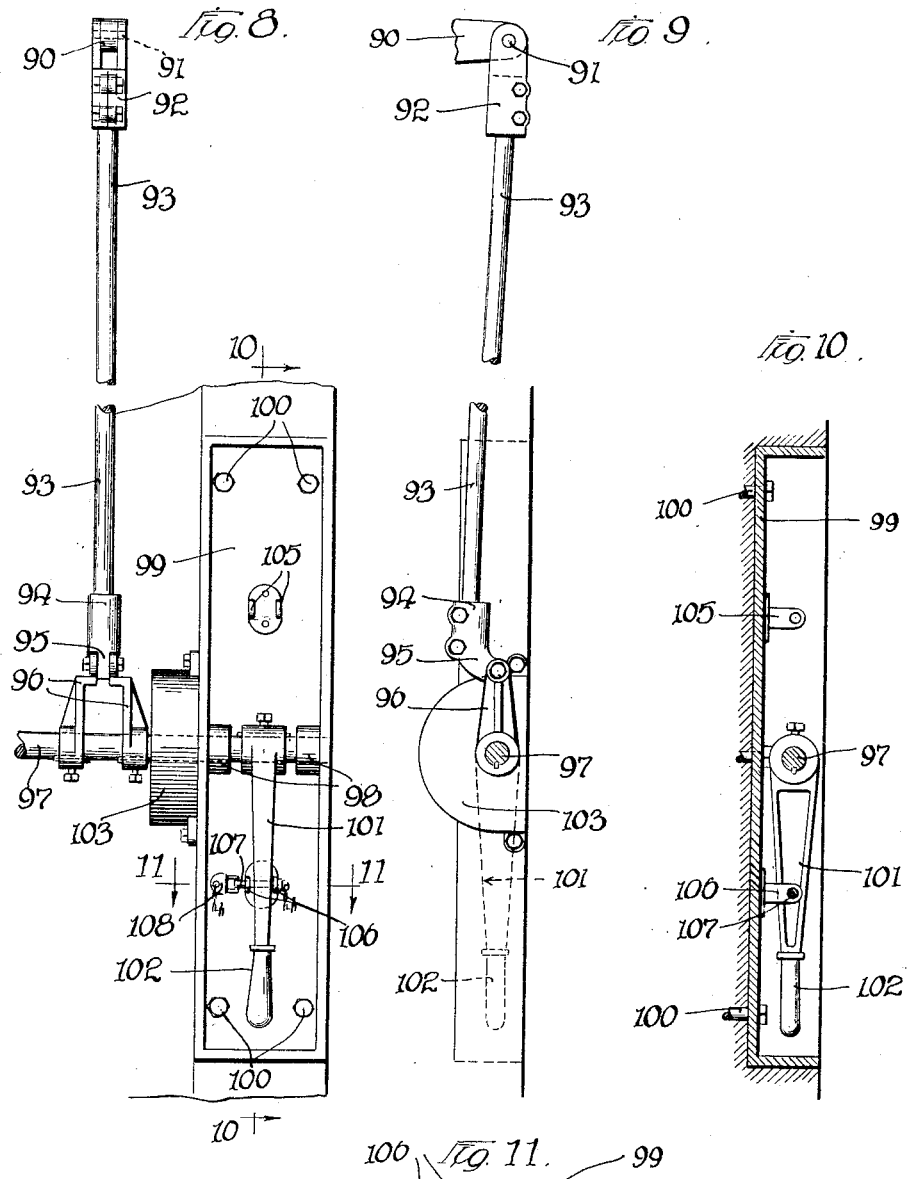

June 22, 1926.
C. CHRISTENSEN
1,589,366
MEANS FOR CONNECTING AND DISCONNECTING ELECTRICAL CIRCUITS
Filed May 18, 1921     7 Sheets-Sheet 6
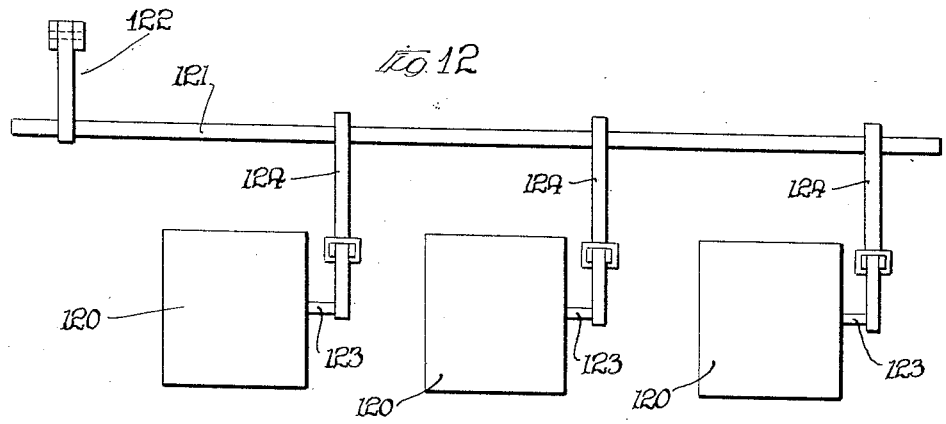
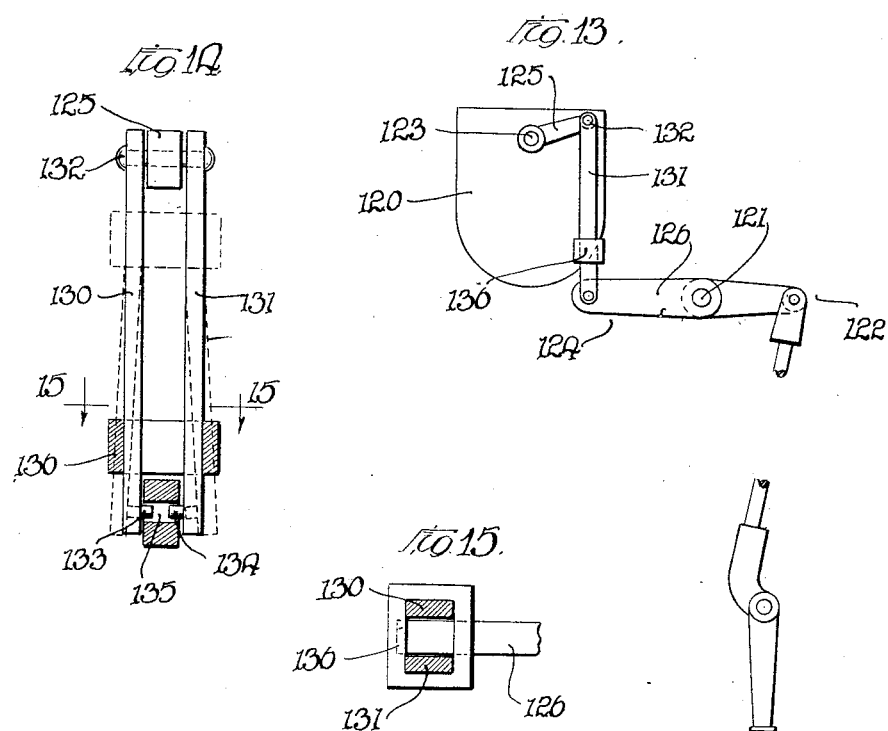

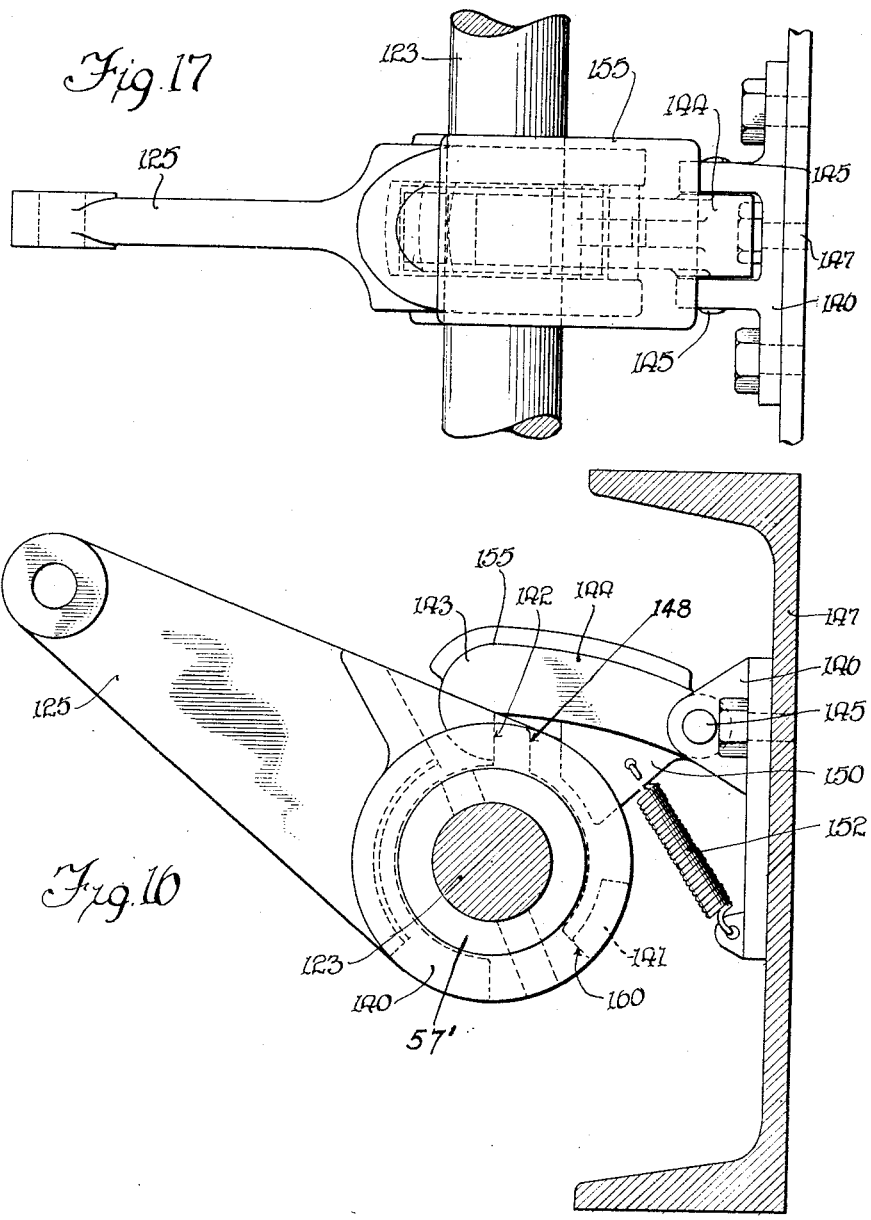

Patented June 22, 1926.

1,589,366

UNITED STATES PATENT OFFICE.

CHRISTEN CHRISTENSEN, OF CHICAGO, ILLINOIS, ASSIGNOR TO ELECTRICAL ENGINEERS EQUIPMENT COMPANY, OF CHICAGO, ILLINOIS, A CORPORATION OF ILLINOIS.

MEANS FOR CONNECTING AND DISCONNECTING ELECTRICAL CIRCUITS.

Application filed May 18, 1921. Serial No. 470,710.

My invention relates to means for connecting and disconnecting electrical circuits.

More particularly, my invention relates to improvements which, while having particular utility in connection with such switches as are adapted for remote control, especially remote control switches of the oil break type, are adapted for highly advantageous use in connection with various other types of switches as well. I do not intend, therefore, to limit the various features of my present invention to a particular type of switch, or to a switch for a particular use or purpose.

Where considerable current must be carried and particularly in manually operated switches where relatively high tension is involved, the matter of providing a quick, positive opening has heretofore presented a difficult practical problem. This is particularly true where a manually operated switch is fairly large and heavy. Heretofore, the speed of opening of the switch has been dependent upon the rapidity of movement of the switch operating mechanism. I find that invariably, due either to the disposition or size of the switch, to carelessness on the part of the operator, or to some other reason, the operating lever is not moved with the necessary rapidity to secure the desired speed of opening which is so essential.

I propose to overcome such difficulties as this by providing means whereby the switch is opened by a normally restrained opening spring or the like, the release of which opens the switch at the desired speed, irrespective of the speed of movement of the switch operating mechanism. In addition, I provide a positive mechanical opening arrangement for opening the switch, should the opening spring for any reason fail to operate.

A further feature of my invention is the provision of an improved and simplified switch operating mechanism consisting of a minimum number of parts. This mechanism includes a novel arrangement for holding the switch in closed position, and a novel arrangement for releasing the holding means and for positively opening the switch in case of failure of the spring opening arrangement, also an extremely simple arrangement for connecting the switch with the operating mechanism, which arrangement is especially applicable where a group of switches are operated from a common operating mechanism, in that it provides means whereby either of the switches may be readily uncoupled from the operating mechanism, so that the disconnected switch and the other switches may be actuated independently. A novel hood is provided for protecting certain elements of the operating mechanism against accumulation of snow, sleet and the like and the weather.

My invention secures speed and positiveness of opening of the switch, positiveness of closing of the switch, simplicity and reliability of the switch operating mechanism and ease of operating and accessibility in a simple, weatherproof, compact and reliable arrangement.

A still further feature of my invention is the provision of a pole mounted oil switch, the connections for which enter the switch through the top thereof. I believe I am the first to make such provision which is important and therefore made the subject matter of certain of the appended claims.

Certain constructional features and arrangements of my invention are novel and important, and are also made the subject matter of some of the appended claims.

In the accompanying drawings:

Figure 1 is a side elevational view of a switch embodying my invention;

Figure 2 is a plan view of the same;

Figure 3 is a horizontal sectional view taken substantially on the line 3—3 of Figure 1.

Figure 4 is a fragmentary vertical sectional view taken substantially on the line 4—4 of Figure 3;

Figure 5 is a vertical cross sectional view taken substantially on the line 5—5 of Figure 1;

Figure 6 is an enlarged detail vertical section taken on the line 6—6 of Figure 5;

Figure 7 is an enlarged detail vertical section taken on the line 7—7 of Figure 5;

Figure 8 is a front elevational view of one form of operating mechanism for the switch.

Figure 9 is a side elevational view of the same;

Figure 10 is a vertical sectional view taken on the line 10—10 of Figure 8;

Figure 11 is an enlarged horizontal section taken on the line 11—11 of Figure 8;

Figure 12 is a diagrammatic plan view showing a group of switches connected with a common operating arrangement;

Figure 13 is a side elevational view of the same;

Figure 14 is an enlarged rear elevational view partly in section of the coupling link shown in Figure 13;

Figure 15 is a horizontal sectional view taken on the line 15—15 of Figure 14;

Figure 16 shows in enlarged side elevation a modification of the actuating mechanism shown in Figures 6 and 7; and Figure 17 is a top plan view of the same.

Referring first to Figures 1 to 7, inclusive, the switch shown therein comprises a closed vessel in the nature of a casing 1 having a removable cover or lid 2. The cover or lid 2 is preferably hinged to the casing or receptacle 1 at one end through cooperating ears or lugs and a suitable pin or pintle 3. A suitable handle may be provided for swinging the cover 2 into open or closed position about the pintle 3. The cover 2 is adapted to be held or locked in its closed position by the cooperation of bolts 4 pivotally secured to the casing 1 as at 5 (Figure 1) with wings or lugs 6 projecting from the cover 2 and suitable wing nuts 7. A packing ring or gasket 29 is preferably provided between the cover or lid 2 and the upper edge of the casing 1 to maintain a tight joint therebetween. Brackets 8 formed integral with the casing 1 provide for securing or mounting the device as desired as by means of suitable bolts 9.

The conductors 10 and 11 are connected into suitable terminal sockets 12 and 13 secured to the upper ends of suitable conducting members 14 and 15 which conducting members 14 and 15 are led through the cover 2 and into the casing 1 by means of suitable insulators 16 and 17 which insulators may be of any suitable or preferred type. The insulators 16 and 17 extend through and are mounted in the cover or lid 2. The mountings are preferably such that the openings through which the insulators extend are sealed to maintain the tight joint between the casing and the cover 1.

In the particular arrangement shown the lower reduced portions 18 and 19 of the insulators extend through and are mounted in mounting rings 20 and 21, respectively. The lower reduced portions 18 and 19 of the insulators are preferably provided with suitable corrugations which corrugations permit the cementitious or binding material 22 to insure a firm grip upon the outer surfaces thereof. The interior surfaces of the mounting rings 20 and 21 may be corrugated likewise if so desired. The under surfaces of the rings 20 and 21 are preferably grooved as shown at 23 to receive the upstanding flanges or ridges 24 which surround the openings in the cover through which the insulators 16 and 17 project. Suitable bolts 25 extend through lugs 26 projecting radially from the bases of the rings 20 and 21 and engage in the upper wall of the cover 2 to securely clamp the rings in place. Packings 27 between the rings and the cover provide tight joints therebetween.

The bores in the insulators 16 and 17 through which the conducting members 14 and 15 extend are sufficiently large to permit of the introduction of adequate cementitious or binding material 28 to secure the conducting members 14 and 15 in place. In the present instance the conducting members 14 and 15 are of square cross-section (Figure 3) while the bores through which they project are circular. Such details as this may however, of course, be varied. The conductors 14 and 15 may be and although not shown are preferably corrugated within the length of the insulators 16 and 17 to insure a firm grip of the cementitious or binding material 28 thereupon or the corresponding bores of the insulators 16 and 17 may even be corrugated if so desired.

The lower end of the conducting member 14 projects from the lower end of the insulator 16 and carries a hinge jaw 30 secured thereto as by means of a suitable bolt 33 and cooperating washers. The hinge jaw 30 preferably comprises suitable metallic strips as shown in Figure 5 so as to yieldingly maintain proper electrical contact with the blade member 31 pivoted therebetween upon a hinge pin or bolt 32. The lower end of the conducting member 15 projects from the lower end of the insulator 17 and has a terminal jaw 34 secured thereto as by means of a bolt 35. The terminal jaw 34 which is preferably of substantially the same formation as the jaw 30 is adapted to receive the free end of the blade 31 to complete the circuit between the socket terminals 12 and 13.

An arm in the form of a pair of links 38 pivoted at their lower ends to the blade member 31 substantially intermediate its opposite ends as shown at 39 extends upwardly within the casing and is pivoted at its opposite end upon a pin 40 extending between and mounted at its opposite ends in a pair of lugs 41. The lugs 41 extend radially from a sleeve 42 fitting within the cover 2 and secured as by means of a key, pin or set screw 43 upon a shaft 44 which shaft extends through and is journaled in the cover 2 as shown to form the operating shaft of the device as will be more fully set out as this description proceeds. The portions of the cover 2 through which the shaft 44 projects are preferably double-walled as shown. A suitable packing may be arranged in the space provided by such walls if so desired to further seal the casing. A coiled spring 45 secured at one end to a lug or arm 47 projecting from the sleeve 42 and at its opposite end to a stud or bolt 46 fixedly secured in one of the walls of the cover 2 tends to turn or rotate the sleeve and shaft in a clockwise direction (Figure 4). This tendency of the sleeve 42 and shaft 44 toward rotation in a clockwise direction tends to swing the blade member 31 clockwise about the hinge pin 32 into open position through the links or arm 38.

An operating arm 50 having an eye 51 at its outer or free end is loosely sleeved or mounted at its inner end through an integral collar or hub portion 52 upon the shaft 44 just without the casing 1. The collar or hub portion 52 of the arm 50 is provided with a lug or finger 53 extending inwardly between a pair of ears 55 and 56 formed integral with and projecting radially from a collar 57 fixed as by means of a suitable key, pin or set screw 58 upon the shaft 44 between the casing 1 and the collar or hub portion 52 of the operating arm 50. The collars 52 and 57 and associated cooperating parts are protected from the weather and such accumulations as sleet, snow and the like by means of a channeled hood 60 pivoted upon a stud 61 secured at its inner end in the adjacent wall of the casing 1 and extending through the depending sides of the channeled hood. A suitable washer and cooperating cotter pin 62 or the like prevents displacement of the hood 60 from the outer end of the stud 61. The outer free end of the hood 60 is preferably curved as shown to closely follow the peripheries of the collars 52 and 57.

Clockwise turning of the operating shaft 44 is normally prevented by engagement of the ear 55 projecting from the collar 57 with a stop 65 depending from the top or upper wall of the hood 60. A coiled spring 66 (Figure 6) connected at one end with a lug 67 formed integral with and projecting radially from the collar 52 and connected at its opposite end with a pin or stud 68 fixed in the journaled hood 60 normally retains the hood 60 and collar 52 in substantially the positions shown.

A pair of links 75 pivotally connected through a pin 76 with the arm 50 between the eyed and collared ends 51 and 52 respectively thereof, are pivotally connected at their opposite ends through a pin 77 with an arm 78, which arm 78 is fixed upon a shaft 79 as by means of a key, pin or set screw 80. The shaft 79 is journaled in a suitable bearing 82 bolted or otherwise suitably secured to the members 83 to which the switch is secured. A threaded stud 84 and cooperating nut 85 at the lower end of the casing 1 (Figure 1) provides for leveling and bracing the same while a threaded plug 86 provides for draining the interior of the casing. Legs 88 may be provided for standing the device upon a suitable supporting surface if so desired.

The particular mechanism for rotating the shaft 79 may be varied. The one shown comprises an arm 90 (Figures 8 and 9) which arm may be fixed upon the shaft 79. The free end of the arm 90 is pivotally connected at 91 to a bifurcated or sectionalized connecting member 92 secured upon the upper end of an operating rod 93. The operating rod 93 extends downwardly from the connecting member 92 to convenient position at the foot of the supporting structure and is there secured in a sleeved member 94 embracing and securely clamped about the lower end thereof. The sleeved member 94 is provided with a tongue 95 projecting and pivoted between a pair of arms 96 fixed upon a shaft 97. The shaft 97 is mounted in suitable bearings 98 carried by a channeled mounting member 99 which mounting member 99 may be secured by suitable bolts 100 or otherwise at the foot of the switch supporting structure.

A lever 101 fixedly mounted upon the shaft 97 within the channeled member 99 and having a suitable operating handle 102 is provided for turning or rotating the shaft 97 to turn the shaft 79 and thereby operate the switch as will be hereinafter more fully set forth. A housing 103 houses and protects the auxiliary switching elements at the foot of the supporting structure. The particular details of such auxiliary switching elements are immaterial in so far as this invention is concerned.

When the lever 101 is in the raised position it is received between the outwardly projecting lugs 105 of a bracket member secured to the mounting base 99. When swung downwardly thru substantially 180 degrees to the full line position shown in Figures 8 and 10, the lever 101 is received between the projecting lugs 106 of a second bracket member secured to the mounting base 99. When in either position a headed bolt 107 is adapted to be inserted through the registering openings provided through the lugs 105 and lever 101 or lugs 106 and lever 101 as the case may be to securely lock the lever 101 against rotation. A pad lock 108 is adapted for cooperative engagement with the locking bolt 107 to prevent removal thereof.

The operation of the arrangement thus far described is as follows:

Assume that the casing 1 is properly mounted, that the conductors 10 and 11 are connected into their respective terminal sockets, that the interior of the casing is substantially filled with oil or other suitable insulating or arc extinguishing liquid and that the blade member 31 is in the position shown at Figure 4 completing the circuit between the conducting members 14 and 15.

To open the switch, the pad lock 108 is removed allowing the locking bolt 107 to be withdrawn from between the lugs 105 or 106 depending of course upon whether the lever 101 is between the lugs 105 or 106 when the switch is closed. The handle 102 is then grasped and the lever 101 revolved in such direction that the shaft 79 will be rotated in a clockwise direction through the arm 90 connected therewith.

This clockwise rotation of the shaft 79 will swing the arm 50 through the arm 78 and links 75 in a clockwise direction turning the collar or hub portion 52 thereof loosely about the shaft 44. Upon such turning, the inwardly projecting lug 53 carried by the hub 52 will be moved toward the ear 56 projecting from the collar 57. Simultaneously, with such movement an arm 112 carried by the hub 52 will be moved up toward a shoulder 114 depending from the top of the hood 60. Upon sufficient rotation of the lever 50 the shoulder 114 will be engaged by the arm 112 and the entire protecting hood 60 swung upwardly about the axis of the stud 61. Upon such upward movement of the hood 60 the stop 65 will be released from the ear 55 projecting from the collar 57 whereupon the spring 45 will be released to turn the shaft 44, sleeve 42 and arm 41 carried thereby quickly in a clockwise direction pushing the blade member 31 downwardly away from the terminal 34 through the links 38 to open the switch.

It will now be apparent that a quick break which is so essential is assured regardless of the speed at which the operating mechanism of the switch is moved to open the same. Once the ear 55 is released, the blade 31 is moved rapidly into open position by the spring 45. Should, for any reason, the spring 45 fail to move the blade 31 into open position upon being released, slightly further rotation of the lever 50 will engage the lug 53 carried thereby with the ear 56 carried by the collar 57 to positively force the same ahead of it in a clockwise direction to disengage the blade from the terminal 34. Upon this positive breaking of contact the spring 45 will effect a quick separation therebetween. However, should the blade become stuck at the hinge terminal for example, the lug 53 will force it into complete open position.

When the blade has been revolved to full open position the bolt 107 and pad lock 108 may be engaged with the lever 101 to securely lock the switch in such position. A suitable lamp may be lighted by the auxiliary circuit to indicate to the operator that the switch is open if so desired. The switch is closed against the tension of the spring 45 by swinging the lever 50 in a counterclockwise direction through the operating mechanism already set out to engage the lug 53 with the shoulder 55 and rotate the collar 57 and shaft 44 in a counterclockwise direction. The hood 60 will thereupon finally drop down to again position the stop 65 in engagement with the ear 55 to prevent opening of the switch under the tendency of the spring 45. Obviously, I have provided for a quick positive opening of the switch and for a positive complete and effective closing of the same as well.

The shaft 44 may be common to a group of switches as through suitable couplings 115 (Figure 3). Frequently in such instances in particular, it is desired to operate one switch independently of the others. I am able to do this by uncoupling the operating mechanism from the particular switch to be operated alone and engaging a suitable operating hook with the eyed end 51 of the lever 50.

In Figure 12 I have shown diagrammatically an arrangement for operating a group of switches 120 embodying my invention from a common shaft 121 arranged entirely without the switches instead of through the casings thereof as before. The shaft 121 is rotated through suitable operating links 122. The switch actuating shafts 123 are actuated from the shafts 101 through suitable links 124. In this arrangement as before, it is frequently desired to operate one switch independently of the others or the others independently of one.

To such end I have provided an extremely simple arrangement for coupling and uncoupling either of the switches from the common operating shaft. This connection which in the particular arrangement illustrated, connects the arm 125 on the shaft 123 with the arm 126 on the shaft 122 (Figure 13) comprises a pair of links or strips 130 and 131 (Figure 14) pivoted at their upper ends upon a pin 132 extending through the arm 125. Studs 133 and 134 project inwardly from the links 130 and 131, respectively, and are adapted to engage in an opening 135 through the adjacent end of the arm 126. A sleeve 136 embraces the links 130 and 131 to hold the studs or pins securely in the opening 135 and thereby connect the strips 130 and 131 to the adjacent end of the arm 126 so that upon rotation of the arm the links will transmit the motion to operate the switch. The desired switch may be quickly and conveniently uncoupled from the shaft 121 by slipping the sleeve 136 upwardly and spreading the lower ends of the links 130 and 131 to disengage the pins or studs 133 and 134 from the opening 135 as shown in dotted lines in Figure 14.

In Figures 16 and 17 I have shown a modified form of actuating arrangement between the arm at the switch and the switch shaft. This is particularly adapted for use where a common operating shaft is arranged without the switches as in Figure 12.

The lever 125 is loosely sleeved at its inner end through an integral collar or hub portion 140 upon the shaft 123. The collar or hub 140 is provided with a lug or finger 141 extending inwardly therefrom. A collar 57' fixed upon the shaft 123 has a shoulder 142 for engagement with the hooked end 143 of an arm 144 pivoted at 145 in a bracket 146 bolted to the channel 147 or other suitable supporting surface adjacent the switch and a shoulder 148 adapted to be engaged by the lug or finger 141 of the lever 125 upon rotation of the lever in a counterclockwise direction. The pivoted arm 144 is provided with a portion 150 which projects down into the path of movement of the lug 141 upon rotation of the lever 145. A coil spring 152 normally retains the arm 144 in substantially the position shown. A cover or hood portion 155 carried by the arm 144 protects the various parts from the weather.

It will now be apparent that upon rotation of the arm 125 in a counterclockwise direction, the lug 141 will first engage the downwardly projecting portion 150 of the arm 144 swinging the arm 144 upwardly about its pivot 145 and the hooked stop portion 143 away from the shoulder 142 of the collar 57'. Thereupon, the spring within the switch casing will be released to rapidly turn the collar 57' and shaft 123 to secure a quick opening of the switch as already fully set forth in connection with Figures 1 to 7, inclusive. As before, should for any reason the spring within the switch casing fail to open the switch slightly further rotation of the lever 125 will engage the lug 141 with the shoulder 148 to positively force the collar 57' ahead of it in a counterclockwise direction to open the switch. Upon this positive breaking of contact, the spring within the casing will cause a rapid opening of the switch or if there should be considerable resistance to such opening, the blade may be forced into complete open position by the lug 141. As before, the switch is positively and completely closed by cooperative engagement between the lug 141 and the shoulder 160. If desired, the spring for throwing the blade 31 may be put under stress by the initial operation of moving the arm 50 before said arm trips out the catch instead of during the return movement. In this event, the initial movement of opening would stress the spring, the succeeding movement would trip the catch, and the final movement would be available for positively shifting the blade in case the spring could not accomplish this.

I claim:

1. In a device of the class described, a casing for holding a liquid bath, a pivot and a contact terminal in said casing, a switch member pivoted to said pivot terminal and movable into and out of engagement with said contact terminal, and means remote from the pivotal mounting of said switch member for moving said member out of engagement with said contact terminal, said means comprising spring means tending to move the switch member out of engagement with the contact terminal, catch means restraining said spring means, and means operable to first release said catch means and free said spring means and thereafter to positively disengage the switch member from the contact terminal in event of failure of said spring means.

2. In a device of the class described, a casing for holding a liquid bath, a pivot and a contact terminal in said casing, a switch member pivoted to said pivot terminal and movable into and out of engagement with said contact terminal, spring means tending to move the switch member out of engagement with the contact terminal, catch means restraining said spring means and means outside said casing for first releasing said catch means to free said spring means and thereafter positively disengaging the switch member from the contact terminal in event of failure of said spring means.

3. In a device of the class described, a casing for holding a liquid bath, a lid for said casing, circuit interrupting means suspended from said lid down into the liquid bath, spring means tending to open the circuit interrupting means, catch means for said spring means, and means carried by the lid for first releasing said catch means and freeing said spring means and thereafter positively opening the circuit interrupting means in the casing in the event of failure of said spring means.

4. In combination, a terminal member, a switch blade member pivotally connected at one end with said terminal member, a second terminal member adapted to be engaged by the opposite end of said switch blade member and a spring mechanism remote from the pivotal mounting of the switch blade member for throwing the switch blade member out of contact with said second terminal member, means restraining said spring means and means operable to first release said restraining means and thereafter to positively disengage the blade from the contact in event of failure of said spring means.

5. In combination, a terminal member, a switch blade member pivotally connected with said terminal member, a second terminal member adapted to be engaged by the switch blade member, spring mechanism for throwing the switch blade member out of contact with said second terminal member and a positive mechanical arrangement remote from the pivotal mounting of the switch blade member for first freeing said spring mechanism and thereafter positively separating said members in the event of failure of said spring mechanism.

6. In combination, a switch blade member, a terminal member for pivotally carrying said switch blade member, a second terminal member adapted to be engaged by the switch blade member, spring mechanism for throwing the switch blade member out of contact with said second terminal member, means for holding the switch blade member in engagement with said second terminal member, a controlling member movable to release said holding means and a positive mechanical arrangement brought into play by continued movement of said controlling member to throw the switch blade member out of contact with the second terminal member in the event of failure of said spring mechanism, said controlling member and said positive mechanical switch actuating arrangement being disposed remote from the pivotal mounting of the switch member.

7. In combination, a shaft adapted for rotation, a switch actuated by rotation of said shaft, a casing enclosing said switch, a collar fixed upon said shaft without said casing, stop means for cooperation with said collar to prevent rotation of said shaft, an operating lever loosely mounted on said shaft adjacent said fixedly mounted collar, said lever having means for releasing the stop means and means engageable with the collar to rotate the shaft and actuate the switch.

8. In combination, a shaft adapted for rotation, a switch actuated upon rotation of said shaft, a casing enclosing the switch, an operating lever, operating means between said lever and shaft and outside the switch casing, a pivoted hood for protecting said operating means, a stop member for preventing rotation of the shaft and means associated with the operating lever for swinging the protecting hood about its pivot to release said stop member.

9. In combination, a casing, a lid for said casing, a pair of conducting members led into the casing through said lid, spring means for breaking the circuit between said conducting members and means carried by said lid for releasing said spring means and operable after release of said spring means to break said circuit in case of failure of said spring means.

10. In combination, a casing adapted for holding a liquid bath, a pair of conducting members led into said casing, normally restrained spring means for breaking the circuit in said liquid bath, operating means without the casing for releasing said normally restrained spring means, said operating means being operable after release of said spring means to break the circuit in the event of failure of said spring means and a protective hood for said operating means.

11. In combination, a casing adapted for holding a liquid bath, a lid hinged to said casing, a pair of conducting members led into said casing, means well down in the casing to be immersed in the liquid bath for interrupting the circuit between said conducting members, a shaft extending through and journaled in said lid remote from said interrupting means, spring means tending to rotate said shaft to break the circuit between said conducting members, said spring means being normally energized when the switch is closed and being operable to cause initial opening of the circuit, means for holding said shaft against rotation, an operating lever on said shaft and means for actuating said operating lever from a distance to release said spring means.

12. In a device of the class described, a container for holding a liquid bath, a lid for said container, circuit interrupting means arranged in said container to be submerged in said liquid bath, a shaft extending through and projecting from said lid, an actuating connection between said shaft and the circuit interrupting means, a collar fixed upon the shaft outside the container, and an operating arm loose on said shaft, a spring tending to open the circuit interrupting means in the casing, and catch means restraining said spring, the operating arm having means for releasing said catch means and for engagement with said collar to open the interrupting means in case of failure of the spring means.

13. In a device of the class described, a container for holding a liquid bath, a lid for said container, circuit interrupting means arranged in said container to be submerged in said liquid bath, a shaft extending through and projecting from said lid, an actuating connection between said shaft and the circuit interrupting means, a collar fixed upon the shaft outside the container, an operating arm loose on said shaft, a spring tending to open the circuit interrupting means in the container, catch means restraining said spring, said operating arm having means for releasing said catch means and for engagement with said collar to open the interrupting means in case of failure of the spring means, and means for returning the collar to its initial position, said collar having cooperative engagement with the operating arm for simultaneously returning said arm to its initial position.

In witness whereof, I hereunto subscribe my name this 11th day of May, 1921.

CHRISTEN CHRISTENSEN.